United States Patent [19]
Al Ghatta

[11] Patent Number: 5,902,864
[45] Date of Patent: May 11, 1999

[54] PROCESS FOR THE PRODUCTION OF POLYESTER RESINS

[75] Inventor: Hussain Al Ghatta, Fiuggi, Italy

[73] Assignee: Sinco Engineering S.p.A., Italy

[21] Appl. No.: 08/892,812

[22] Filed: Jul. 15, 1997

[30] Foreign Application Priority Data

Jul. 18, 1996 [IT] Italy .................................. MI96A1486

[51] Int. Cl.⁶ ............................ C08G 63/80; C08G 63/91
[52] U.S. Cl. ............................ 525/437; 528/296; 528/486
[58] Field of Search ............................ 525/437; 528/296, 528/486

[56] References Cited

U.S. PATENT DOCUMENTS

| | | |
|---|---|---|
| 4,224,264 | 9/1980 | Ort et al. . |
| 5,334,669 | 8/1994 | Ghisolfi ................................... 525/437 |
| 5,376,734 | 12/1994 | Al Ghatta . |
| 5,510,454 | 4/1996 | Stouffer et al. . |

FOREIGN PATENT DOCUMENTS

| | | |
|---|---|---|
| 422 282 | 4/1991 | European Pat. Off. . |
| 422282 | 4/1991 | European Pat. Off. . |
| 683 191 | 11/1995 | European Pat. Off. . |
| 1905 677 | of 0000 | Germany . |
| 1156321 | of 0000 | Japan . |
| WO 93/08226 | 4/1993 | WIPO . |

*Primary Examiner*—Patricia A. Short
*Attorney, Agent, or Firm*—Edward D. Manzo; Mark J. Murphy

[57] ABSTRACT

Process for the production of aromatic polyester resins starting from resins with an IV from 0.1 to 0.4 dl/g comprising the steps of blending the resin with a dianhydride of a tetracarboxylic acid, extruding the resin under the form of a strand, cooling the strand or the chips obtainable by cutting the strand, at a temperature between 150° C. and 210° C. and maintaining the same temperature for sufficient time to obtain a crystalline product wherein the DSC curves of the same do not show presence of premelt peaks or only in a negligible amount.

11 Claims, 2 Drawing Sheets

PROCESS FOR THE PRODUCTION OF POLYESTER RESINS

BACKGROUND OF THE INVENTION

The present invention is directed to an improved process for the production of polyester resin.

Aromatic polyester resins employable in applications such as molding, extrusion, injection and similar operations require relatively high molecular weights corresponding to intrinsic viscosity (IV) values generally higher than 0.65–0.75 dl/g.

The resins for film and fibre, on the contrary, have lower IV values, between about 0.6 and 0.75 dl/g.

The preparation of the resins is typically carried out by polycondensation of an aromatic dicarboxylic acid, normally terephthalic acid or its alkyl diesters with an aliphatic glycol operating under temperature and pressure conditions such as to obtain a resin with IV values as high as possible. It is difficult, however, to reach IV values above 0.65–0.75 dl/g because of the high melt viscosity which prevents an efficient removal of the byproducts of reaction.

Therefore, the reaction of polycondensation in a melt state (MPC) is carried out under high vacuum to remove the reaction byproducts.

The MPC polycondensation, however, is an expensive operation which is desirable to avoid.

The resin to be used for molding and similar operations, after the MPC stage, is then subjected to polycondensation treatment in solid state (SSP) with the aim of increasing the IV to the desired values (0.75–1.2 dl/g).

Prior to the SSP treatment, the resin granules are subjected to a crystallization treatment directed at increasing as much as possible the crystallinity of the polymer so as to avoid in the subsequent SSP step packing and sticking of the granules which under severe conditions can lead to plant stoppage.

The SSP step, however, requires a relatively long time (from several to 10 or more hours depending on the final IV value to be obtained).

Working in the MPC step with non high melt viscosity values and therefore with the IV of polymer relatively low, it is possible to more easily remove the reaction byproducts and to lower in this way its duration. The increase in IV to desired values could thereafter be obtained by SSP.

However, there exist limits in decreasing of melt viscosity mainly due to the presence of a large quantity of olygomers which are formed when operating under such conditions. The olygomers, in the next SSP step, cause the formation of cyclic compounds whose presence has a negative influence on the flowability of granules and therefore the regularity of the SSP operation.

With the aim of overcoming the above inconveniences it was proposed in U.S. Pat. No. 5,376,734 to add, with the resins having an IV lower than 0.57 dl/g, a dianhydride of a tetracarboxylic acid, for example pyromellitic dianhydride (PMDA), and to conduct the SSP reaction in the presence of such a dianhydride.

The IV values of the resins with which the dianhydride is added are not in practice lower than 0.4 dl/g (in the examples 0.408 dl/g). After addition of the dianhydride, the resin is pelletized by conventional systems and then has to be subjected to crystallization with the aim of being able to carry out the SSP treatment.

SUMMARY OF THE INVENTION

It has now been unexpectedly found that starting from resins with IV values lower than 0.4 dl/g and between 0.1 and 0.4 dl/g, preferably 0.2–0.3 dl/g, added in the melt with a dianhydride of a tetracarboxylic acid, preferably an aromatic tetracarboxylic acid, that resins possessing sufficient melt strength to be extruded in the form of a cuttable strand are obtained. Further, if the strand or granules obtainable from the strand are subjected to crystallization at the extruder exit, operating at a temperature between about 150° and 210° C. for sufficiently long time, crystalline organizations are obtained such that in the DSC curves of the resin after crystallization premelt peaks are not present, or are present only in limited quantity.

The crystallized resin thus obtained can be treated in the next SSP step at higher temperatures than those normally used, with consequently significant reductions in the treatment duration.

The process of the present invention presents therefore the advantage not only of being able to eliminate the crystallization treatments following the pelletization of the resin, but also exert a positive influence on the SSP step even though starting from resins with a low IV.

Furthermore, the addition of dianhydride with the melted resin allows results in a crystallized resin with an IV higher than that of the starting resin. The resins thus obtained are characterized by an IV higher than 0.4 dl/g. After SSP treatment, the resins show IV values generally higher than 0.8 dl/g. In their DSC curves, there is no presence of premelt peaks, or if present, their melt enthalpy is lower than 5 J/g. These resins are new products.

The process of the present invention when it is realized continuously starting from the preparation step of the resin to the final SSP steps, comprises the following phases:

a) polycondensation of an aromatic dicarboxylic acid, or of its alkyl diester, preferably terephthalic acid, with an aliphatic diol under conditions such as to obtain a resin with an IV between 0.1 and 0.40 dl/g;

b) mixing of the resin in melt state with a dianhydride of a tetracarboxylic acid, preferably pyromellitic dianhydride, in quantity between 0.01 and 2% by weight;

c) extrusion of melted resin in strand form;

d) maintaining the strand at a temperature between 150° and 210° C. for sufficient time for the crystallization of the resin, so that in the DSC curves of the same there are no premelt peaks or, if present, their enthalpy is less than 5 J/g;

e) cutting of the strand to form chips, operating preferably at temperatures near to those of crystallization (the cutting of the strand can be carried also in cold conditions);

f) SSP treatment of the chips operating at temperatures between ca. 160° and 250° C., preferably between 210° and 230° C., until the desired rise in IV (0.8–1.2 dl/g) is obtained.

Steps from a) to e) can be realized separately from step f). The cutting of the strand can precede the crystallization phase, which is then realized on the chips and not on the strand.

The SSP treatment is preferably carried out in a polymer fluid bed reactor in current or counter-current of an inert gas (nitrogen). The relationship in weight between the hourly rate of gas and that of the polymer withdrawn is preferably between 0.2 and 0.6. Preferably the cooling of the strand at a temperature suitable for the crystallization is carried out utilizing nitrogen coming from the SSP step.

Preferably the crystallization temperature of the strand is between 170° and 190° C., with time between about 5 to 30 minutes. The strand can be collected on a metal conveyor belt maintained at the crystallization temperature, operating in an inert gas atmosphere. Normally, after crystallization, the chips obtained can be subjected to heat setting with the aim of obtaining improved homogenization of polymer crystallinity.

The mixing of resin melt with the dianhydride of tetracarboxylic acid of stage b) is realized in conventional type mixers, for example static mixers, formed of a pipe provided with streambrakers.

Residence time in the mixer is selected so as to avoid an excessive increase in resin IV, higher for example than 0.6–0.7 dl/g. The time is generally less than 180 seconds.

The polycondensation of the resin is carried out according to known techniques.

It is preferable to operate under conditions to obtain resins with an IV of 0.2–0.3 dl/g.

The polyester resins utilized in the process of the present invention are obtained by polycondensation according to known methods of an aromatic dicarboxylic acid or its alkyl diester, preferably terephthalic acid or naphthalene dicarboxylic acids, with aliphatic diols with 2–10 C, such as ethylene glycol, butylene glycol, 1,4 cyclohexane dimethylol, 1–3 propylene glycol.

Polyethyleneterephthalate and ethylene terephthalate copolymers, wherein up to about 15% by weight of units deriving from terephthalic acid are substituted by units deriving from isophthalic acid and/or naphthalene dicarboxylic acids, and polybutylene terephthalate and butylene terephthalate copolymers, are the preferred resins.

The resins before extrusion to form the strand, can be mixed with additives such as stabilizers, dyes and nucleating agents normally employed in the field of polyester resins.

The addition of nucleating agents favours the next crystallization step.

The dianhydrides of tetracarboxylic acids preferably comprise in addition to pyromellitic dianhydride, the dianhydrides of acids 3,4,3', 4'-diphenyl tetracarboxylic, 2,4,3', 4'-benzophenone tetracarboxylic, 1,2,3,4,-cyclobutane tetracarboxylic. In order to obtain resins with particularly high melt strength, particularly after blending with the dianhydride, it is convenient to add the same in the form of a concentrate with polycarbonate resins.

The dianhydride is added in quantities from 0.01 to 2% by weight.

The high viscosity resins obtainable with the process of the present invention are utilizable either for molding, extrusion or injection blow-molding, for example in the preparation of beverage bottles and foamed materal, or in the preparation of fibres and films.

DETAILED DESCRIPTION OF THE PRESENTLY PREFERRED EMBODIMENTS

The following examples are given to illustrate but not to limit the present invention.

The intrinsic viscosity reported in the examples and indicated in the text is determined in a solution of 0.5 g of resin in 100 ml of a blend 60/40 by weight of phenol and tetrachloroethane at 25° C. according to ASTM D 4603–86.

The DSC curves were realized with a heating speed of 10° C./min.

EXAMPLE 1

A suspension of 18 moles of terephthalic acid and 24.12 moles of ethylene glycol is caused to react in a reactor provided with a stirrer, at the temperature of 240° C. and at a relative pressure of 1 bar per 270 min. The esterification phase is followed by polycondensation operating at 270° C. with a residual pressure of 20–25 mbar for a duration of 260 min.

After polycondensation, the polymer IV was 0.290 dl/g and the carboxylic number 289 eq/T. The polymer melt was added with 0.4% by weight of PMDA and afterwards extruded to form a strand that was cooled with hot nitrogen at a temperature of 180° C. and maintained at this temperature for 10 min. The strand was then cut while hot, and the chips sent to a reactor for polycondensation in a the solid state, operating in nitrogen stream and heated at 220° C. The duration of the polycondensation treatment was 10 hours; the IV after the treatment was 0.84 dl/g.

Sticking of particles was not observed during the SSP phase.

The DSC of chips after crystallization showed a slight premelt peak at 160° C. with $\Delta H=0.0257$ J/g The melt peak occurred at 243° C., with $\Delta H=40$ J/g.

EXAMPLE 2

Example 1 was repeated with the difference that the strand was cooled to 180° C. and maintained at that temperature for 10 min.

Figure 1:
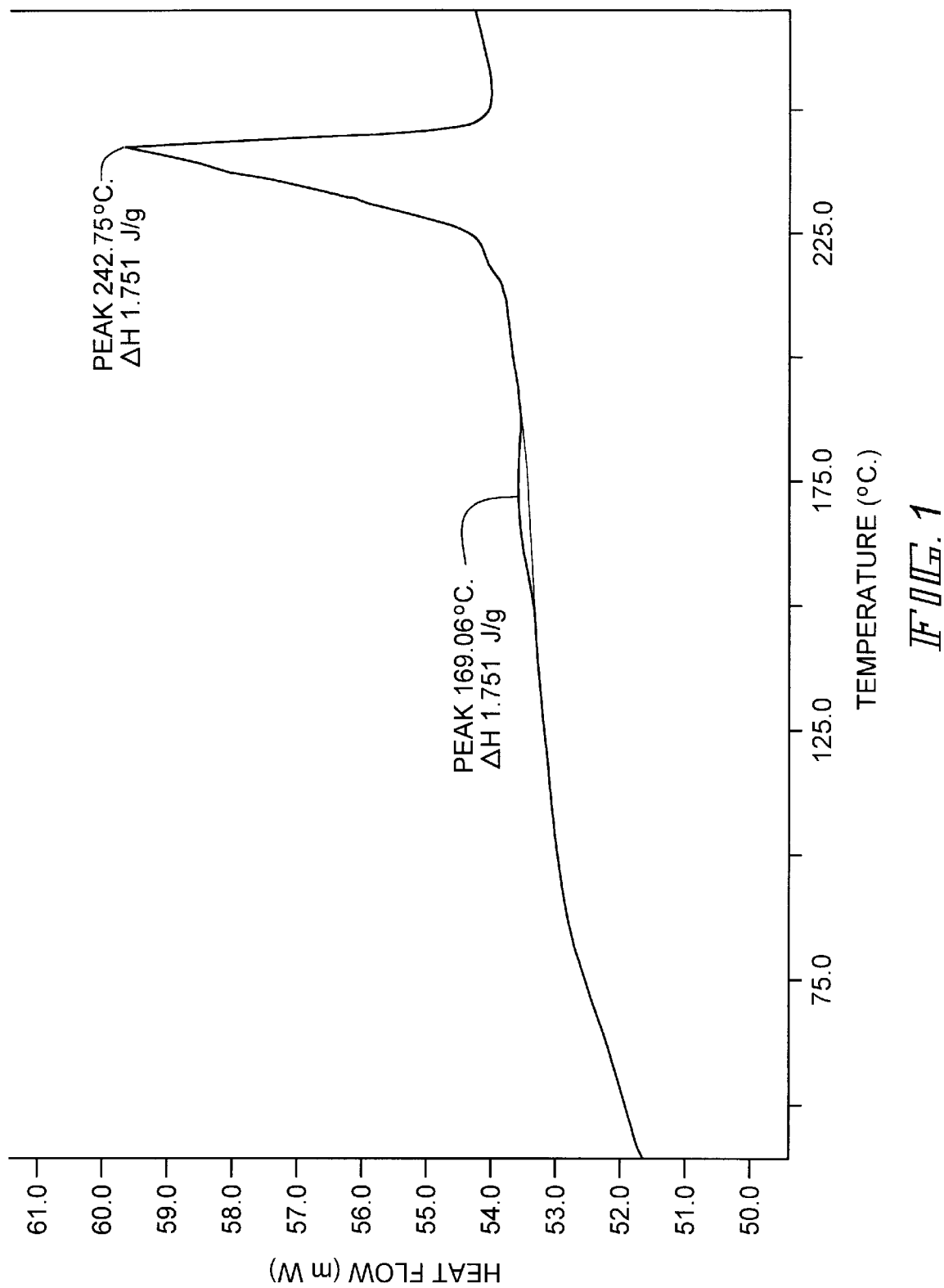
FIG. 1 shows a DSC curve for the chips obtained according to example 2.

The DSC curve of the chips obtained showed a slight premelt peak at 169° C. with $\Delta H=1.751$ J/g. The melt peak appeared at 243° C., with $\Delta H=42$ J/g (FIG. 1).

The IV after polycondensation in the solid state was 0.85 dl/g.

EXAMPLE 3

Figure 2:
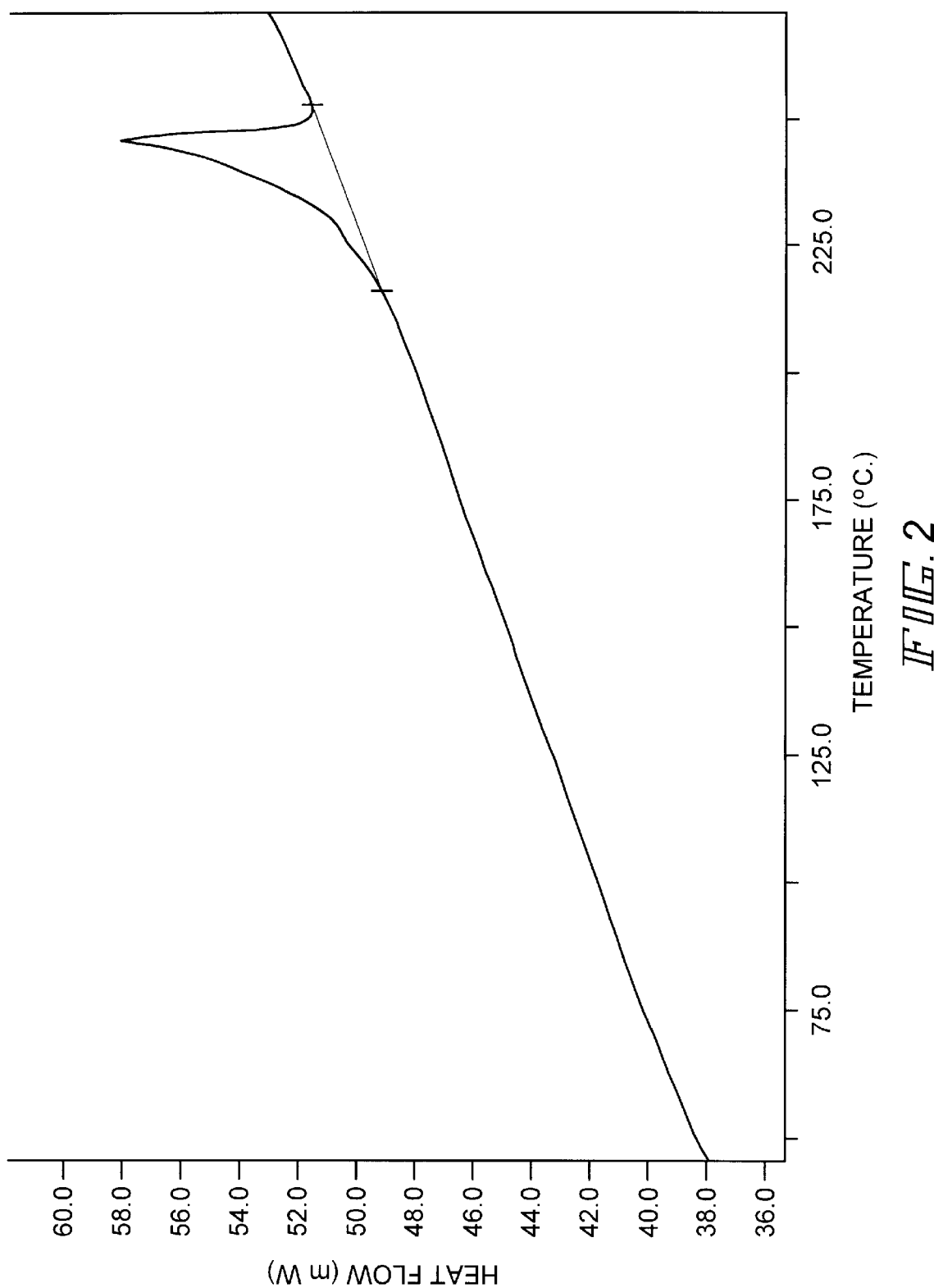
FIG. 2 shows a DSC curve for the chips obtained according to example 3.

Example 2 was repeated with the difference that the strand was cooled to 185° C. and maintained at that temperature for 10 min. The DSC curve of the polymer obtained in this way does not show any premelt peak. The melt peak is at 245° C. with a $\Delta H=39$ J/g (FIG. 2).

Comparison Example 1

It was operated as in example 1 with the only difference that the polymer did not contain PMDA. It was not possible to extrude the resin to form a strand.

I claim:

1. Process for the preparation of aromatic polyester resins starting from resins with an intrinsic viscosity between 0.1 and 0.4 dl/g added in the melt state with a dianhydride of tetracarboxylic acid, comprising the steps of:
   a) extruding the resin and dianhydride in the form of a strand;
   b) maintaining the strand at a temperature between 150° C. and 210° C. for a sufficient period of time to obtain a crystallized product in the DSC curves of which premelt peaks are not present or, if present, their melt enthalpy is lower than 5 J/g.
   c) cutting of the strand to form chips.
2. Process according to claim 1, wherein the dianhydride of a tetracarboxylic acid is pyromellitic dianhydride.

3. Process according to claim 1 wherein the molten strand is solidified at temperature between 170° C. and 200° C. in an inert gas stream.

4. Process according to claim 1 wherein the resin is selected from the group consisting of polyethylene terephthalate, polybutylene terephthate, ethylene terephthalate copolymers in which the 15% in moles of the units deriving from terephthalic acid are substituted by units deriving from isophthalic acid and/or naphthalene dicarboxylic acids.

5. Process according to claim 1, wherein the crystallized chips are sent to a polycondensation reactor in the solid state (SSP).

6. Process according to claim 5, wherein the chips are sent to the SSP reactor while they are at a temperature between 170° and 200° C.

7. Process according to claim 6, wherein the strand is maintained at crystallization temperature utilizing the heat of the nitrogen recycled from the SSP reactor.

8. Process according to claim 6 wherein the polycondensation treatment in the solid state is carried out at a temperature between 160° C. and 250° C.

9. Process according to claim 5, wherein the strand is maintained at crystallization temperature utilizing the heat of the nitrogen recycled from the SSP reactor.

10. Process according to claim 9 wherein the polycondensation treatment in the solid state is carried out at a temperature between 160° C. and 250° C.

11. Process according to claim 5, wherein the polycondensation treatment in the solid state is carried out at a temperature between 160° and 250° C.

* * * * *